(12) United States Patent
Put et al.

(10) Patent No.: US 8,147,793 B2
(45) Date of Patent: Apr. 3, 2012

(54) PROCESS FOR THE MANUFACTURE OF NANO-SIZED POWDERS

(75) Inventors: Stijn Put, Turnhout (BE); Yves Van Rompaey, Westerlo (BE); Sylvain Van Den Rul, Aartselaar (BE)

(73) Assignee: Umicore, Brussels (BE)

( * ) Notice: Subject to any disclaimer, the term of this patent is extended or adjusted under 35 U.S.C. 154(b) by 125 days.

(21) Appl. No.: 12/515,476

(22) PCT Filed: Oct. 18, 2007

(86) PCT No.: PCT/EP2007/009022
§ 371 (c)(1),
(2), (4) Date: Jul. 1, 2009

(87) PCT Pub. No.: WO2008/064741
PCT Pub. Date: Jun. 5, 2008

(65) Prior Publication Data
US 2009/0302268 A1    Dec. 10, 2009

Related U.S. Application Data

(60) Provisional application No. 60/873,028, filed on Dec. 6, 2006.

(30) Foreign Application Priority Data

Dec. 1, 2006  (EP) .................................. 06024894

(51) Int. Cl.
*C01G 9/02*    (2006.01)

(52) U.S. Cl. ................................... 423/594.14; 423/622
(58) Field of Classification Search .................. 423/622, 423/623, 600, 599, 594.14
See application file for complete search history.

(56) References Cited

U.S. PATENT DOCUMENTS 6,254,940 B1    7/2001    Pratsinis et al.
2003/0230554 A1    12/2003    Schroder et al.

FOREIGN PATENT DOCUMENTS

WO    WO 2006/071199    7/2006

OTHER PUBLICATIONS

International Preliminary Report on Patentability, issued in PCT/EP2007/009022, dated Jun. 11, 2009.

*Primary Examiner* — Edward Johnson
(74) *Attorney, Agent, or Firm* — Brinks Hofer Gilson & Lione

(57) ABSTRACT

Nano-sized metal-bearing powders and doped-powders are synthesized by means of a process whereby a non-volatile metal-bearing precursor powder or powder mixture is dispersed in a hot gas stream at relatively low temperatures. A first volatile reactant is added, converting the metal in the precursor into a volatile metal compound. Subsequently a second volatile reactant is injected into the gas stream, converting the volatile metal compound into a solid, which condenses as a nano-sized metal-bearing powder upon quenching. Finally, the vapour/metal-bearing powder mixture is separated from the gas stream.

15 Claims, 3 Drawing Sheets

PROCESS FOR THE MANUFACTURE OF NANO-SIZED POWDERS

This application is a National Stage application of International Application No. PCT/EP2007/009022, filed Oct. 18, 2007, which claims priority to European Patent Application No. 06024894.5, filed Dec. 1, 2006, and U.S. Provisional Patent Application No. 60/873,028, filed Dec. 6, 2006, the entire contents of which are hereby incorporated by reference.

This invention pertains in general to methods and processes for the synthesis of nano-sized particles. In particular, the present invention concerns the manufacture of metal-bearing nano-sized powders starting from a refractory or high-boiling precursor.

Nanoparticles generally indicate particles with at least one dimension less than 100 nm. The small size of these particles can be beneficial for specific mechanical, optical, electrical, chemical, magnetic and/or electronic properties compared to bulk materials.

A wide range of synthesis routes are currently being developed to make nanopowders. Thereby, so-called top-down approaches are an extension of traditional methods for the production of nanocrystalline powders by reducing the particle size from micron-scale down to nanopowders. These processes generally involve some form of high-energy milling. A major disadvantage of this high-energy milling process is the long milling times, from several hours up to many days. Due to the wear of the milling media, especially with high-energy milling, contamination of the end product is a serious risk.

The most recent developments in nanopowder production techniques are situated in bottom-up approaches. In all these processes, the major issue to overcome consists in controlling nucleation and growth of the particles. The different techniques can be classified in solid, liquid, and vapour techniques, including sol-gel processes, colloidal precipitation, hydrothermal processes, and gas phase synthesis routes.

Known gas phase synthesis routes for the manufacture of nanopowders involve the injection of a volatile precursor in a hot gas stream, followed by the reaction of this precursor with a gaseous substance, thereby forming the desired compound. This compound condenses and nucleates, either in the hot gas stream if it is refractory or high-boiling, or else upon cooling of the gas.

US2004/0009118 describes a continuous method for producing metal oxide nanoparticles by means of a microwave plasma with a hot zone of at least 3500° C. In US2004/0005485, a process for the manufacturing of nano-scaled powders is described, wherein the step of providing thermal energy raises the peak processing temperature to at least 3000 K. The vaporization of solid precursors may imply extremely high temperatures, above 3000 K, in particular when the precursor compound happens to be refractory or high-boiling. Such extreme temperatures result in high energy losses. The production apparatus itself becomes expensive as it has to withstand extreme conditions.

In U.S. Pat. No. 6,669,823, stoichiometric nano-sized materials, as for example cerium oxide powders, are synthesized through introduction of an oxidising gas into the plasma. U.S. Pat. No. 6,254,940 describes the production of nanoparticles starting from boric acid, $BCl_3$, $SiCl_4$, silane, metal halide, metal hydride, metal alcoholate, metal alkyl, metal amide, metal azide, metal boronate, metal carbonyl and combinations of these materials. These materials are heated in a flame reactor and passed between plate electrodes. In U.S. Pat. No. 5,788,738, nano-sized oxide powders are synthesized through injection of metal powders together with an inert carrier gas. However, the injection of metal powders as precursor may cause safety problems during handling. These safety problems can be overcome by using inert refractory powders as injection material. Additionally, partially melting of the precursor may occur during injection which may be harmful for the process.

The present invention solves the above-mentioned problems by proposing a reaction scheme that includes the preliminary conversion of a less volatile metal-bearing precursor into a more volatile intermediate. This conversion can be realized at relatively low temperatures, well below the volatilization temperature of the precursor.

Accordingly, a new process for the production of a nano-sized metal-bearing powder is divulged, comprising the steps of:
  (a) providing a hot gas stream at a temperature of 1000 K to 3000 K, wherein
    a solid metal-bearing precursor compound is dispersed; and
    a first volatile reactant is introduced,
    whereby a gaseous metal intermediate compound is formed, said compound being volatile at a temperature lower than the volatilization temperature of the precursor;
  (b) introducing a second volatile reactant into the gas stream whereby the gaseous metal intermediate compound is converted into a nano-sized metal-bearing powder; and
  (c) separating the nano-sized metal-bearing powder from the gas stream.

This process is particularly suitable when the solid metal-bearing precursor is non-volatile at the temperature of the hot gas stream.

The production of nano-sized powder is further enhanced by quenching the gas stream after the step of introducing the second volatile reactant and before separating the nano-sized metal-bearing powder; alternatively, quenching can be combined with the introduction of the second volatile reactant in the gas stream.

The above process can be used for the manufacture of mixed or doped oxides by starting from a solid metal-bearing precursor powder mixture containing at least two metals.

A nano-sized mixed or doped oxide can also be prepared starting from a solid metal-bearing precursor powder which is dispersed in a second metal-bearing liquid or gaseous precursor.

The hot gas stream can be generated by means of either one of a gas burner, a hydrogen burner, an RF plasma, or a DC arc plasma.

The process is specially adapted for the use of one or more of ZnO, $GeO_2$, $In_2O_3$, indium-tin-oxide, $MnO_2$, $Mn_2O_3$ and $Al_2O_3$ as solid precursor.

The first volatile reactant advantageously comprises either one or more of hydrogen, nitrogen, chlorine, CO, or a volatile hydrocarbon such as methane or ethane. The second volatile reactant preferably comprises oxygen or nitrogen, such as air.

According to a preferred embodiment, the precursor comprises a micron-sized or submicron-sized ZnO powder, the first volatile reactant is methane, and the second volatile reactant is air.

In a further preferred embodiment, the second volatile reactant is used to quench the hot gas stream to a temperature below 250° C.

In a further preferred embodiment, the solid precursor is a mixture of ZnO and either one or more of $Al_2O_3$, Al and $MnCl_3$ powder.

By volatilization temperature of the metal-bearing precursor is meant the temperature at which the precursor either evaporates or decomposes into at least one metal-bearing gaseous species.

The details of the invention are illustrated in FIGS. 1 to 4:

One advantage of this invention is that a wider range of potentially cheap or easy to handle precursor compounds becomes usable, including in particular those that are refractory or high-boiling.

A further advantage of this invention is that the process can be carried out at relatively low temperature: between 1000 and 3000 K, or preferably between 2000 and 3000 K. This mitigates both energy loss and construction materials requirements.

Moreover, the residence time of the precursor in the gas stream can be short, allowing the process to be carried out in a compact apparatus.

To ensure fast kinetics, a gas stream temperature of preferably at least 500 K, and more preferably at least 800 K above the volatilization temperature of the intermediate could be used. The resulting kinetics then allow for the nearly complete (>99.9 wt %) conversion of the precursor into nanopowder with a residence time of the precursor in the hot gas stream of only 100 ms or less.

According to thermodynamic calculations, many relevant metal-bearing precursors show volatilization points above 2000 K. In the presence of a volatile reactant (such as hydrogen, methane, ethane, propane, chlorine or combinations thereof) a thermodynamic environment is created which favours the formation of an intermediate metal-bearing compound with a significantly lower volatilization temperature. It is advisable to form an intermediate metal-bearing compound having a volatilization temperature that is at least 500 K lower than that of the precursor.

Figure 1:
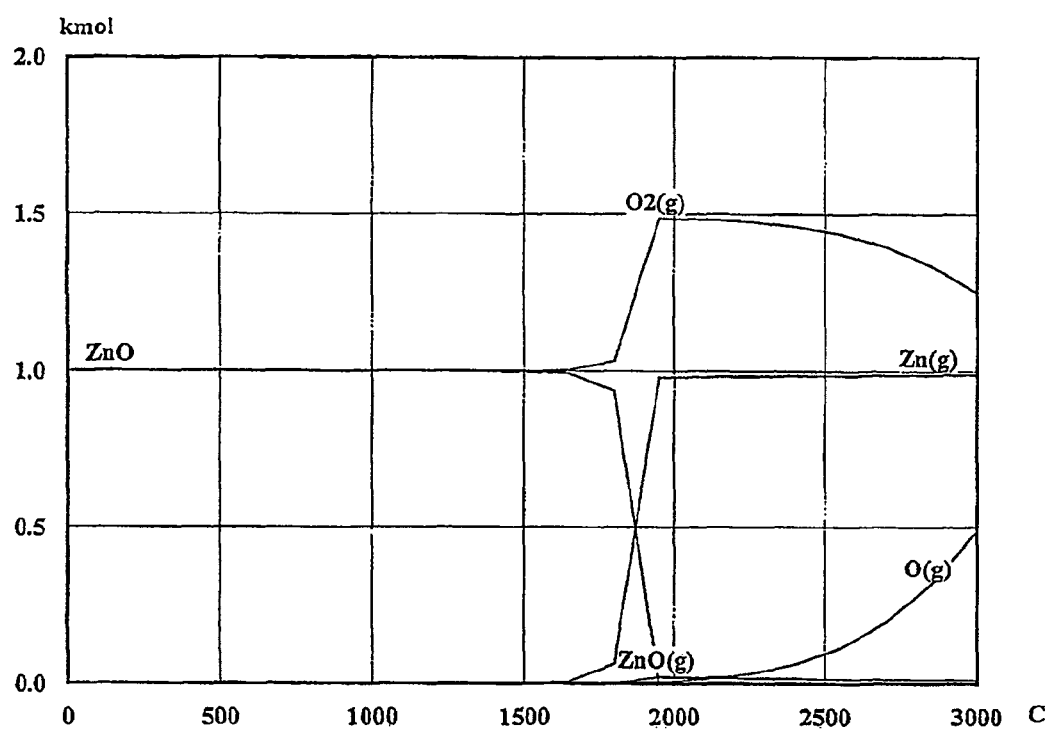
FIG. 1 is a calculated phase preponderance diagram showing, as a function of temperature, the volatilization of zinc oxide in the presence of oxygen.

FIG. 1 shows the result of thermodynamic calculations for the volatilization of zinc oxide in the presence of oxygen. It is shown that under normal atmospheric (oxidic) conditions, solid ZnO will completely form zinc gas only at temperatures above 2200 K.

Figure 2:
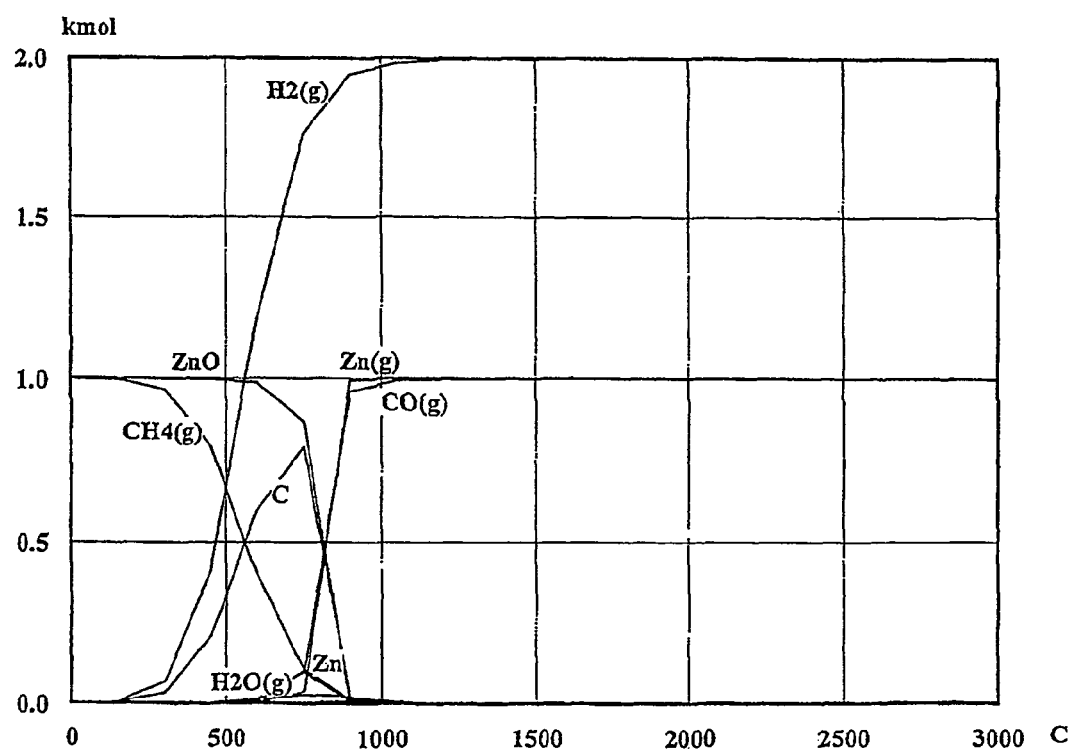
FIG. 2 is a calculated phase preponderance diagram showing, as a function of temperature, the volatilization of zinc oxide in the presence of methane.

FIG. 2 shows the thermodynamic data for the volatilization of zinc oxide in the presence of methane. A gaseous zinc compound will be formed at the much lower temperature of about 1100 K. Re-oxidation of this zinc gas in combination with fast quenching results in the formation nano-sized ZnO powder.

In a similar way, $GeO_2$, which has a volatilization point higher than 2000 K will, in the presence of a reducing atmosphere of e.g. methane, form a sub-stoichiometric oxide GeO with a volatilization point lower than 1500 K. Oxidation of this GeO, followed by fast quenching, will finally result in nano-sized $GeO_2$ powder. Analogue thermodynamic calculations have been performed for $In_2O_3$, $Mn_2O_3$, $MnO_2$ and $Al_2O_3$, as shown in Table 1.

TABLE 1

Examples of the conversion of refractory precursors into volatile metal-bearing compounds

| Precursor | ZnO | $GeO_2$ | $In_2O_3$ | $Mn_2O_3$/ $MnO_2$ | $Al_2O_3$ |
|---|---|---|---|---|---|
| Volatilization (K) | >2200 | >2000 | >2000 | 2900 | 3250 |
| 1st Volatile reactant | $CH_4$ | $H_2$ or $CH_4$ | $H_2$ | $CH_4$ | $CH_4$ |
| Volatile intermediate | Zn(g) | GeO(g) | $In_2O$(g) | Mn(g) | $Al_2O$(g) |
| Volatilization (K) | 1100 | <1500 | <1500 | 2200 | 2000 |
| 2nd Volatile reactant | air | air | air | air | air |
| Nanopowder | ZnO | $GeO_2$ | $In_2O_3$ | $MnO_2$ | $Al_2O_3$ |

The hot gas stream used in the invention may be generated by a flame burner, a plasma torch such as a microwave plasma, an RF or DC plasma arc, an electric heating or conductive heating furnace. In the former case, it may be useful to produce combustion gasses that already contain the volatile reactant needed to convert the metal in the precursor into a volatile intermediate. A lean combustion mixture could be used, thus introducing the reducing gas through the burner.

This process can be applied to the manufacture of nano-sized ZnO, starting from coarse ZnO powder. In this case, the non-volatile metal-bearing precursor powder is (relatively coarse) ZnO; the first volatile reactant is a reducing gas; the volatile metal compound is metallic Zn; the second volatile reactant is air; and the nano-sized metal-bearing powder is again ZnO. Although refractory, ZnO is indeed chosen as a precursor because it is both cheap and widely available as a powder.

The process can further advantageously be applied for the production of mixed oxides such as indium-tin-oxide. The first volatile reactant may comprise hydrogen gas, nitrogen, chlorine, carbon monoxide, a volatile hydrocarbon such as methane or ethane, or others. The second volatile reactant may comprise air, oxygen and nitrogen.

Once the final reaction product is formed, it is useful to quench the reactant as well as the gas. Quenching is hereby defined as to cool the hot gas and powder rapidly, so as to avoid the aggregation, sintering and growth of the nanoparticles. This quenching can e.g. be performed by injecting a relatively large amount of cold air into the mixture of gas and nanoparticles. The nanoparticles are readily entrained by the gas flow and can be separated, e.g. with filters.

The invention will now be further illustrated by following examples:

EXAMPLE 1

Figure 3:
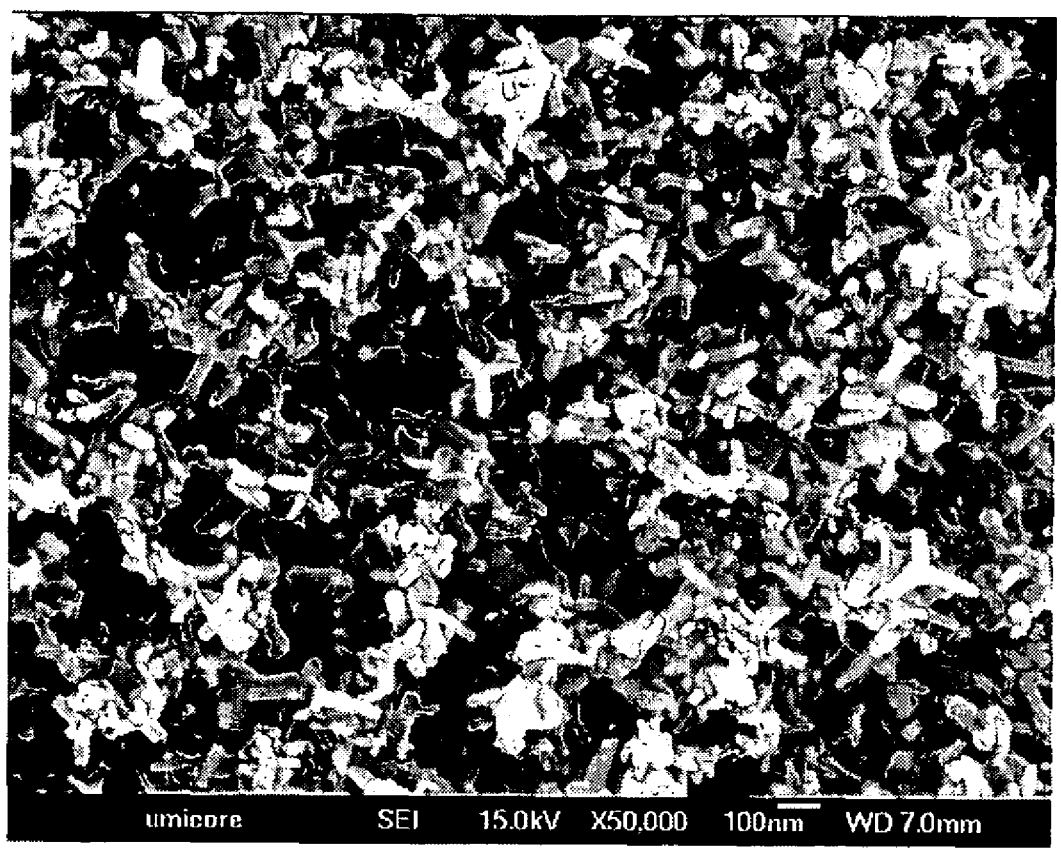
FIG. 3 shows a SEM picture of nano-sized zinc oxide obtained according to the invention.

A 500 kW DC plasma torch is used, with nitrogen as plasma gas. The gasses exiting the plasma at a rate of 160 $Nm^3$/hour are at about 2500 K. Relatively coarse ZnO powder with a specific surface area of 9 $m^2/g$ is injected behind the plasma at an injection rate of 30 kg/hour, together with a flow of 17.5 $Nm^3$/hour natural gas. In this zone, the coarse ZnO powder is reduced to volatile metallic Zn vapour. Thereafter, air is blown, thereby oxidizing the Zn vapour gas. Subsequently, air is blown at a flow rate of 15000 $Nm^3$/hour to quench the gas/solids flow and produce nano-sized ZnO powder. After filtering, nanopowder is obtained with a specific surface area of 30 $m^2/g$. A FEG-SEM micrograph of the particles is shown in FIG. 3, illustrating nano-sized ZnO powder with average primary particle size well below 100 nm.

EXAMPLES 2 AND 3

The same apparatus as in Example 1 was operated according to the conditions shown in Table 2. It can be concluded that increasing the precursor throughput from 30 to 40 kg/h still results in a ZnO nanopowder. In both experiments, a nano-sized ZnO powder is obtained with an average primary particle size well below 100 nm.

EXAMPLE 4

This Example is similar to Example 2. The quench air is however injected in 2 steps. Straight behind the oxidation air inlet, a first quench step is performed with an airflow of 500 Nm$^3$/h, in order to cool the gases as well as the ZnO powder to a temperature of about 600° C. Afterwards the particles stay at this temperature during a period between 1 and 10 s. Subsequently, a second quench step by means of an airflow of 14500 Nm$^3$/h applied, down to a temperature below 250° C. As shown in Table 2, this 2 step quench enables to decrease the specific surface area of the particles from 37 m$^2$/g down to 30 m$^2$/g. Table 2 summarises the Examples 1 to 4.

TABLE 2

Experimental conditions for the production of nano-sized ZnO using a DC plasma

|  | Example 1 | Example 2 | Example 3 | Example 4 |
|---|---|---|---|---|
| Conditions |  |  |  |  |
| Plasma gas | nitrogen | nitrogen | air | nitrogen |
| Plasma gas flow (Nm$^3$/h) | 160 | 160 | 160 | 160 |
| Zinc oxide feed (kg/h) | 30 | 40 | 40 | 40 |
| Natural gas flow (Nm$^3$/h) | 17 | 17 | 17 | 17 |
| Quench flow (Nm$^3$/h) | 15000 | 15000 | 15000 | 500 + 14500 |
| Properties |  |  |  |  |
| Specific surface area (m$^2$/g) | 40 | 37 | 35 | 30 |
| Average particle size (nm) | 27 | 29 | 30 | 37 |

EXAMPLE 5

A 100 kW RF inductively coupled plasma (ICP) torch is used, using an argon/natural gas plasma with 3 Nm$^3$/h argon and 0.3 Nm$^3$/hour natural gas. Relatively coarse ZnO powder is injected at rate of 500 g/hour in the downstream region of the ICP torch, where the plasma reaches a temperature of about 2000 K. As described above, the ZnO powder is totally reduced to metallic Zn, which volatilizes. Air is blown further downstream of the torch, thereby oxidizing the Zn and producing nano-sized ZnO. More air is blown at a rate of 20 m$^3$/h to quench the gas/solids flow. After filtering, nano-sized ZnO powder is obtained having a specific surface area of 20 m$^2$/g.

EXAMPLE 6

The ICP torch of Example 5 is used, with a 15:1 argon: hydrogen gas mixture as plasma gas. Relatively coarse GeO$_2$ powder, having an average particle size of 0.5 µm is injected in the ICP torch at rate of 500 g/hour. The GeO$_2$ powder is thereby reduced to a GeO sub-oxide, which volatilizes. Oxygen is blown at the plasma torch output, thereby oxidizing the GeO and producing nano-sized GeO$_2$. More air is blown at a rate of 30 m$^3$/hour to quench the gas/solids flow. After filtering, nano-sized GeO$_2$ powder is obtained having a specific surface area of 35 m$^2$/g, which corresponds to an average spherical particle size of 30 nm.

EXAMPLE 7

Figure 4:
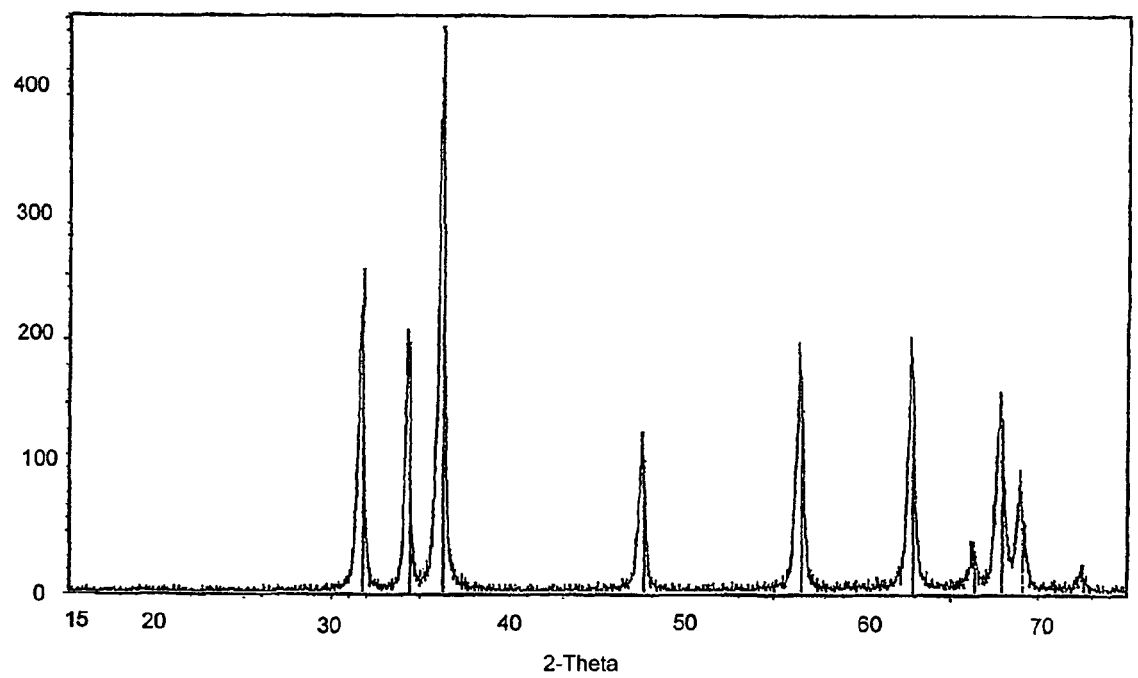
FIG. 4 shows an X-ray diffraction spectrum of a nano-sized Al-doped ZnO powder obtained according to the invention.

The DC plasma torch of Examples 1 to 4 is used, with nitrogen as plasma gas. The gasses exiting the plasma at a rate of 160 Nm$^3$/hour are at about 2500 K. Relatively coarse ZnO powder, with a specific surface area 9 m$^2$/g, is premixed with micron-sized aluminium powder. This powder mixture is injected behind the plasma at an injection rate of 40 kg/h, together with a flow of 17.5 Nm$^3$/h of natural gas. In this zone, the coarse Al/ZnO powder mixture is reduced to a volatile metallic Zn and Al vapour. Thereafter, air is blown, thereby oxidizing the vapour. Subsequently, air is blown at a flow rate of 15000 m$^3$/h to quench the gas/solids flow and produce a nano-sized Al-doped ZnO powder with 1 wt % Al. After filtering, nanopowder is obtained with a specific surface area of 27 m$^2$/g. The XRD spectrum shown in FIG. 4 reveals the hexagonal crystal structure of ZnO with a small peak shift, indicating that Al is embedded in the crystal lattice of ZnO. Alloying levels of 0.1, 0.5, 1, 2, 5, 10 and 15 wt % were obtained by varying the relative amount of Al in the feed.

EXAMPLE 8

The DC plasma torch of Examples 1 to 4 is used, with nitrogen as plasma gas. The gasses exiting the plasma at a rate of 160 Nm$^3$/hour are at about 2500 K. Relatively coarse ZnO powder, with a specific surface area 9 m$^2$/g, is premixed with micron-sized aluminium oxide (Al$_2$O$_3$) powder. This powder mixture is injected behind the plasma at an injection rate of 40 kg/h, together with a flow of 17.5 Nm$^3$/h of natural gas. In this zone, the coarse Al$_2$O$_3$ and ZnO powder mixture is reduced to a volatile metallic Zn and Al vapour. Thereafter, air is blown, thereby oxidizing the vapour. Subsequently, air is blown at a flow rate of 15000 m$^3$/h to quench the gas/solids flow and produce a nano-sized Al-doped ZnO powder with 1 wt % Al. After filtering, nanopowder is obtained with a specific surface area of 26 m$^2$/g. The XRD spectrum reveals the hexagonal crystal structure of ZnO with a small peak shift, indicating that Al is embedded in the crystal lattice of ZnO.

EXAMPLE 9

The DC plasma torch of Examples 1 to 4 is used, with nitrogen as plasma gas. The gasses exiting the plasma at a rate of 160 Nm$^3$/h are at about 2500 K. Behind the plasma, relatively coarse ZnO powder, with a specific surface area 9 m$^2$/g, is injected together with MnCl$_3$ at an injection rate of 40 kg/h, together with a flow of 17.5 Nm$^3$/h of natural gas. In this zone, the coarse MnCl$_3$/ZnO mixture is reduced to a volatile metallic Zn and Mn vapour. Thereafter, air is blown, thereby oxidizing the vapour. Subsequently, air is blown at a flow rate of 10000 m$^3$/h to quench the gas/solids flow and produce a nano-sized Mn-doped ZnO powder. After filtering, nanopowder is obtained with a specific surface area of 29 m$^2$/g. The XRD spectrum reveals the hexagonal crystal structure of ZnO with a small peak shift, indicating that Mn is embedded in the crystal lattice of ZnO. Alloying levels of 0.1, 0.5, 1, 2, and 5 wt % were obtained by varying the relative amount of MnCl$_3$ in the feed.

EXAMPLE 10

The DC plasma torch of Examples 1 to 4 is used, limiting the power input to 250 kW, and using nitrogen as plasma gas. The gasses exiting the plasma at a rate of 160 Nm$^3$/h are at about 1900 K. Relatively coarse ZnO powder is injected behind the plasma at an injection rate of 25 kg/h, together with natural gas. In this zone, the coarse ZnO powder is reduced to a volatile metallic Zn vapour. Thereafter, air is blown, thereby oxidizing the Zn vapour. Subsequently, air is blown at a flow rate of 15000 Nm³/h to quench the gas/solids flow and produce nano-sized ZnO powder. After filtering, nanopowder is obtained with a specific surface area of 35 m²/g.

The invention claimed is:

1. A process for the production of a nano-sized metal-bearing powder comprising:
    (a) providing a hot gas stream at a temperature of 1000 K to 3000 K, wherein
    a solid metal-bearing precursor compound is dispersed; and
    a first volatile reactant is introduced,
    whereby a gaseous metal intermediate compound is formed, said compound being volatile at a temperature lower than the volatilization temperature of the precursor;
    (b) introducing a second volatile reactant into the gas stream whereby the gaseous metal intermediate compound is converted into a nano-sized metal-bearing powder; and
    (c) separating the nano-sized metal-bearing powder from the gas stream.

2. The process of claim 1, wherein the solid metal-bearing precursor is non-volatile at the temperature of the hot gas stream.

3. The process of claim 1, wherein between the step of introducing the second volatile reactant and separating the nano-sized metal-bearing powder, the gas stream is quenched.

4. The process of claim 1, wherein during the step of introducing the second volatile reactant, the gas stream is quenched.

5. The process of claim 1, wherein the nano-sized metal-bearing powder that is produced comprises a nano-sized, doped metal-bearing powder and wherein the solid metal-bearing precursor compound comprises a solid metal-bearing precursor powder mixture containing at least two metals.

6. The process of claim 1, wherein the nano-sized metal-bearing powder that is produced comprises a nano-sized, doped metal-bearing powder and wherein the solid metal-bearing precursor compound comprises a solid metal-bearing precursor powder that is dispersed in a second metal-bearing liquid or gaseous precursor.

7. The process of claim 1, wherein the hot gas stream is provided by a gas burner, a hydrogen burner, an RF plasma, or a DC arc plasma.

8. The process of claim 1, wherein the solid precursor comprises one or more of ZnO, $GeO_2$, $In_2O_3$, indium-tin-oxide, $MnO_2$, $Mn_2O_3$ or $Al_2O_3$.

9. The process of claim 1, wherein the first volatile reactant comprises one or more of hydrogen, nitrogen, chlorine, CO, or a volatile hydrocarbon.

10. The process of claim 9, wherein the volatile hydrocarbon is methane or ethane.

11. The process of claim 1, wherein the second volatile reactant comprises one or more of oxygen or nitrogen.

12. The process of claim 11, wherein the second volatile reactant is air.

13. The process of claim 1, wherein the solid precursor comprises a micron-sized or sub-micron-sized ZnO powder, the first volatile reactant is methane, and the second volatile reactant is air.

14. The process of claim 13, wherein the second volatile reactant quenches the hot gas stream to a temperature below 250° C.

15. The process of claim 13, wherein the solid precursor is a mixture of ZnO and one or more of $Al_2O_3$, Al, or $MnCl_3$ powder.

* * * * *